(12) United States Patent
Abid et al.

(10) Patent No.: US 9,826,413 B1
(45) Date of Patent: Nov. 21, 2017

(54) METHOD AND APPARATUS FOR IMPLEMENTING NETWORK RADIO FREQUENCY COVERAGE MAPPING

(71) Applicant: ROCKWELL COLLINS, INC., Cedar Rapids, IA (US)

(72) Inventors: Ramsey F. Abid, Ellicott City, MD (US); Ning Shen, Columbia, MD (US); Douglas H. Feiock, Annapolis, MD (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 15/205,741

(22) Filed: Jul. 8, 2016

(51) Int. Cl.
*H04W 4/00* (2009.01)
*H04W 16/18* (2009.01)
*G07C 5/00* (2006.01)
*H04W 64/00* (2009.01)
*H04B 7/185* (2006.01)

(52) U.S. Cl.
CPC ............ *H04W 16/18* (2013.01); *G07C 5/008* (2013.01); *H04B 7/18506* (2013.01); *H04W 64/003* (2013.01)

(58) Field of Classification Search
CPC .... G08G 5/006; G08G 5/0013; G08G 5/0026; G08G 5/0021; G08G 5/025; H04M 19/044; H04W 4/021

USPC ...................................... 455/404.2, 431, 430
See application file for complete search history.

(56) References Cited

U.S. PATENT DOCUMENTS

2008/0051947 A1* 2/2008 Kemp ................ B64D 45/0015
 701/3
2016/0363660 A1* 12/2016 Gudim ...................... G01S 3/26

* cited by examiner

*Primary Examiner* — Tu X Nguyen
(74) *Attorney, Agent, or Firm* — Angel N. Gerdzhikov; Donna P. Suchy; Daniel M. Barbieri

(57) ABSTRACT

A system and method are provided for producing radio-frequency (RF) coverage maps for networks of ground stations. The coverage maps are produced from ground station log files that are generated for a particular network of RF radio stations, including an ARINC VHF Data Link Mode 2 (VDLM2) Network. A coverage map regarding interactive communications between aircraft and various ground stations at a particular location therefrom is generated based on actual available operating data including geographic locating of an aircraft, which may be according to Global Positioning Satellite (GPS) system data or other aircraft geolocating data, and Received Signal Strength Indication (RSSI) measurements for the data exchange with the aircraft. Collected and/or recovered actual available operating data may be massaged to determine an actual coverage map, which may map the RSSI measurements to associated aircraft geographic locations to provide indications of relative signal strengths at various points around the particular location.

15 Claims, 8 Drawing Sheets

METHOD AND APPARATUS FOR IMPLEMENTING NETWORK RADIO FREQUENCY COVERAGE MAPPING

BACKGROUND

The inventive concepts disclosed herein relate to systems and methods for producing radio-frequency (RF) coverage maps for networks of ground stations. The coverage maps are produced from ground station log files that are generated for a particular network of RF radio stations, including an ARINC VHF Data Link Mode 2 (VDLM2) Network.

Modern commercial and business-type passenger and cargo aircraft are equipped with increasingly sophisticated avionics suites. More and more, data communications between the aircraft and the ground are used to facilitate information exchange with various nodes for administrative flight following, aircraft system monitoring, and alert and warning information which may be of use to the pilots or aircrew in the aircraft, or to the entities exercising administrative or operational control over the aircraft on the ground.

Aircrew have come to expect, and to rely on virtually continuous data stream availability to aid in all phases of aircraft operations as data is exchanged between aircraft and ground stations, in an automated or semi-automated manner. In the aircraft, data is often translated for graphical display on one or more graphical display components as cockpit design is increasingly dedicated to the use of such interactive displays for information display, and many aircraft control and monitoring functions. An objective is to provide the aircrew with easy-to-interpret information at a glance upon which they can make decisions regarding safe and efficient operation of the aircraft while airborne, and modify operations in response to certain unexpected conditions. The particular configuration of the avionics suite in the aircraft will often define the data exchange capabilities for the aircraft.

Various networks exist for data exchange between aircraft and the ground stations that populate the network, providing the data communications coverage for aircraft operating in a particular locale. Among those networks is ARINC's VHF Data Link Mode 2 (VDLM2) Network. As indicated briefly above, data link technology is now a standard in many routine communications between flight crews and air traffic service providers. In addition, flight-operations applications including graphical weather descriptions, electronic charts, and engine/aircraft health monitoring programs are commonly used employing routine data exchange to enhance flight efficiency and safety of flight. The reliance on the routine exchange of information led to an increasingly strong need for greater digital bandwidth from what was historically provided by, for example, character-oriented data network communications available according to the Aircraft Communications Addressing and Reporting System (ACARS®) technology using Minimum Shift Keying (MSK) over carrier transmitted Amplitide Modulation (AM).

VDLM2 was developed and deployed as a bit-oriented, air/ground and ground/ground data link technology to deliver information at a rate of more than ten times the rate used by ACARS®. VDLM2 is able to deliver ACARS® messages using the protocol ACARS over Aviation VHF Link Control (AOA). VDLM2 is based on International Civil Aviation Organization (ICAO) standards and recommended practices (SARPs) and allows for a distributed architecture with future-proof growth potential. VDLM2 is currently the only technology that is compliant with ICAO Aeronautical Telecommunication Network (ATN) requirements for delivering controller-pilot data link communications (CPDLC), also referred to as controller pilot data link (CPDL), which provides a method for air traffic controllers to communicate with aircrew over a datalink system instead of, or in addition to, communications via VHF voice. Among the advantages of VDLM2 is the expanded bandwidth of the system, which supports the provision of an expanded range of flight information, aeronautical operational control, and air traffic control applications and services in data exchange with participating aircraft.

Each VDLM2 installation consists of a number of ground stations that are particularly placed, often in the vicinity of airports to attempt to ensure continuous communication between aircraft and the data network. Simulations are employed to provide a basic local architecture for initial positioning of a particular number of ground stations at a specified location. An evaluation may be undertaken to determine an initial ground station system laydown to provide reasonable communication coverages as the aircraft flies in a vicinity of a particular location in order that an assessment can be made as to whether VHF communication services are ubiquitously available to a particular aircraft in the vicinity of the particular location. A shortfall in the employment of simulations is that they may not account for certain operational issues (including multipath issues) and certain physical limitations including, but not limited to, undocumented obstructions. In this latter category, for example, airports change as construction on, or in a vicinity of, an airport facility emplaces unforeseen obstructions to continuous network communication coverage.

Simulations have previously been used to estimate a coverage area surrounding a particular station. Simulations are, however, only as good as the inputs provided. In this regard, a particular simulation may provide a picture of what an expected area of RF coverage looks like. Ground stations are then deployed typically on, or in a vicinity of, a particular airport according to such expected areas of RF coverage. The airport is populated with a number of ground stations until an estimate is made, based on the simulation, that full area coverage in a vicinity of the airport has been achieved.

The above conventional scheme provides some manner of a planning tool but does not supplant a need for some manner of collection of actual measurements in order to determine an area of coverage in the vicinity of a particular station.

It has been extremely difficult to characterize the actual performance of VDLM2 ground stations, to establish the RF coverage area of a ground station, and to validate the RF predicted coverage produced from simulations. To date, the most common method used to collect coverage and performance data is to instrument avionics hardware on a particularly outfitted aircraft and to collect logs from either dedicated or revenue flights. There are substantial drawbacks associated with this method of coverage verification in that certification issues abound, access to such dedicated assets is very limited, and the dedicated flight time is expensive and requires extensive planning.

It is not considered acceptable to simply wait for aircrew complaints and the attendant disruptions of operations and observations regarding the lack of appropriate customer service by the network provider.

SUMMARY

In one aspect, the inventive concepts disclosed herein may provide a network analysis system that includes a data exchange device communicatively coupled with participating aircraft operating in a vicinity of the data exchange device; and a processor that is programmed to implement the disclosed schemes. The processor may be programmed to (1) receive operating data from the participating aircraft; (2) extract a position of at least one of the participating aircraft from the received operating data; (3) assess a signal strength of communications with the at least one of the participating aircraft for the extracted position; (4) generate a data element including the assessed signal strength for the extracted position of the at least one of the participating aircraft; and (5) output a graphical indication of the generated data element.

In another aspect, the inventive concepts disclosed herein may provide a method for implementing a network analysis that includes the steps of (1) establishing communications between a data exchange device and participating aircraft operating in a vicinity of a the data exchange device; (2) receiving, with a processor, operating data from the participating aircraft; (3) extracting, with the processor, position reference data for at least one of the participating aircraft from the received operating data; (4) assessing, with the processor, a signal strength of communications with the at least one of the participating aircraft, the assessed signal strength being correlated to the extracted position reference data; (5) generating a data element including an assessed signal strength indication for the correlated extracted position reference data for the at least one of the participating aircraft; and (6) outputting a graphical indication of the generated data element.

These and other features and advantages of the disclosed systems and methods are described in, or apparent from, the following detailed description of various exemplary embodiments.

BRIEF DESCRIPTION OF THE DRAWINGS

Various exemplary embodiments of the disclosed systems and methods for producing radio-frequency (RF) coverage maps for networks of ground stations from ground station log files that are generated for a particular network of RF radio stations, including an the VDLM2 Network, will be described, in detail, with reference to the following drawings, in which.

DETAILED DESCRIPTION

Figure 1:
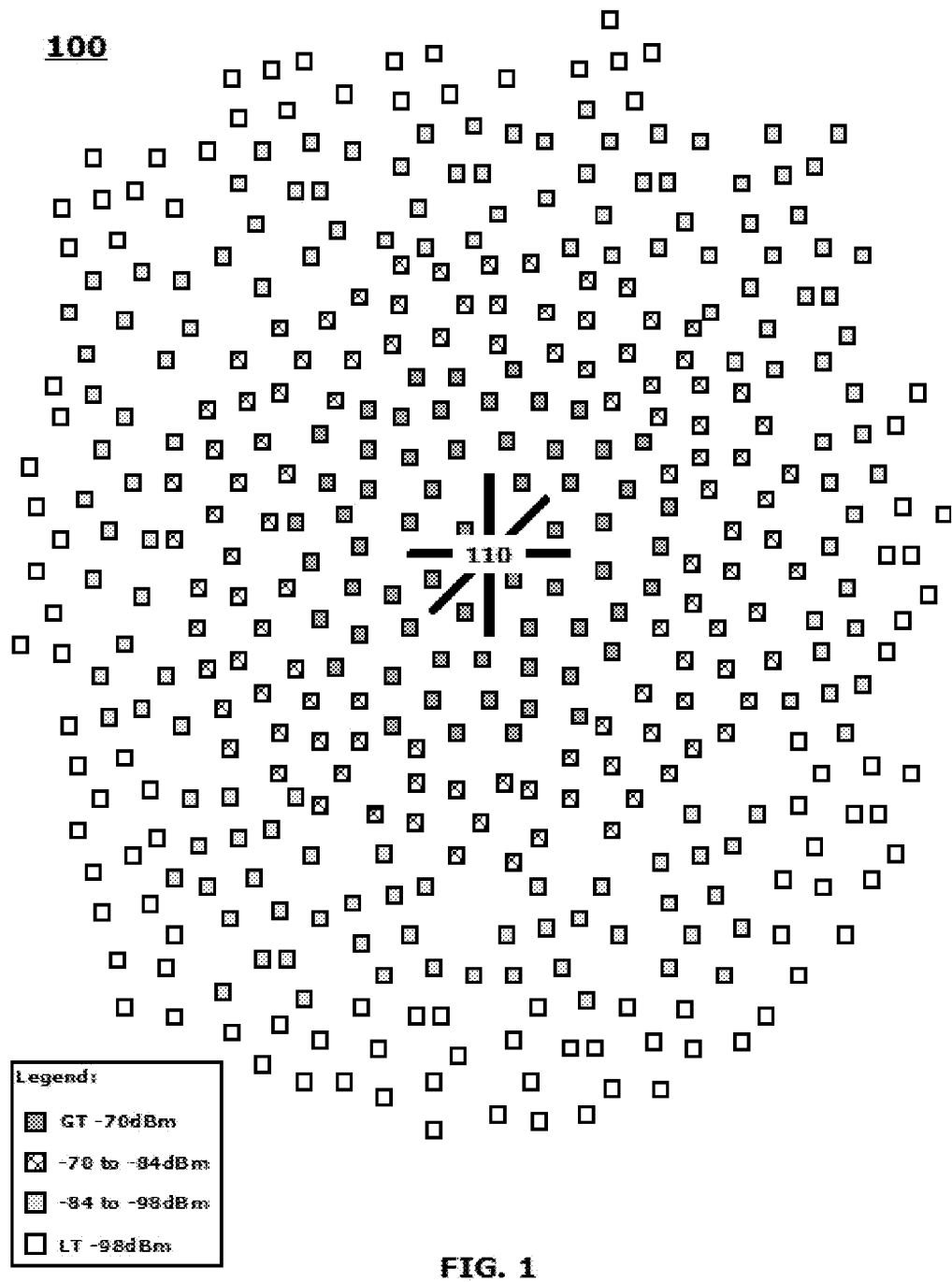
FIG. 1 illustrates a first exemplary coverage map presentation that may be produced according to the inventive concepts disclosed herein in which fairly symmetrical and unobstructed coverage is measured around a particular location.

The disclosed systems and methods for producing radio-frequency (RF) coverage maps for networks of ground stations from ground station log files that are generated for a particular network of RF radio stations, including the VDLM2 Network, will generally refer to these specific utilities for those systems and methods. Exemplary embodiments described and depicted in this disclosure should not be interpreted as being specifically limited to any particular configuration of an aircraft avionics suite (including communications capabilities and cockpit image display components), or to any particular communication protocol by which information may be selectively transmitted as generated data streams to aircraft in flight for display on the cockpit image display components. Any advantageous use of the disclosed schemes for providing RF coverage maps is contemplated.

The disclosed schemes may provide a particularly advantageous capability by which RF coverage maps are produced for ground stations based on available, at-hand information that is currently collected and that could be associated and analyzed to assess RF coverage around a particular location and could further be applied to increase the fidelity of a particular simulation regarding predictive RF coverage around the particular location.

Systems and methods according to the inventive concepts disclosed herein will be described as being particularly adaptable to employment scenarios in which VDLM2 is the data communication network of choice. This focus on a particular RF data exchange communication network is not intended to preclude adaptability of the disclosed systems and methods to beneficial employment in other RF data exchange communication networks. Further, any reference to a particular employment scenario for the disclosed RF coverage map generating schemes should be understood to be illustrative only in providing a descriptive real-world utility for the disclosed systems and methods, and should not be considered as limiting those systems and methods, or their relative utilities, in any way.

Additional features and advantages of the disclosed embodiments will be set forth in the description that follows, and in part will be obvious from the description, or may be learned by practice of the disclosed embodiments. The features and advantages of the disclosed embodiments may be realized and obtained by means of the instruments and combinations particularly pointed out in the appended claims.

In VDLM2, avionics send XID commands to request a link establishment or a link handoff. The frames are logged by any of the ground stations that receive them. The structure of the XID frame in the VDLM2 data communication scheme facilitates implementation of some embodiments of the inventive concepts disclosed herein. Within the XID frame, for example, are Public and Private Parameters and within the Private Parameter is an optional field that is the Aircraft Location Parameter. This parameter defines the current aircraft position including latitude, longitude, and altitude.

Below is an example of the XID command with the highlighted data being the GPS information.

04/04/16 00:00:53.332. 6 Rhan 2301 1020BA 1602DA52B0308C57BF828000140109383838353A31-393933020200010303208480F00036000
15603010183044B464C4C840413BCBD1C821C14028-25C14020A5E14822852140202581482
54501402C25614028E52040124010101.

A proprietary radio interface control document (ICD) includes a Signal Quality Parameter (SQP) message that describes the quality of each message that is decoded by the radio. Included in the SQP message is a Received Signal Strength Indicator (RSSI) field that is a measure of the signal level of each downlink and reports this level in the SQP message. The SQP messages are added to the log files immediately following the XID commands.

This is an example of the SQP message with the highlighted data being the RSSI information.

04/04/16 00:00:53.333. 6 Rhan 2302 1020BA 0601A318EAFFB801260002000000.

According to the inventive concepts disclosed herein, particular information from the log files may be parsed and/or extracted to populate a data base. Each message is dissected into subcomponents in order that the particular sub-components containing the information of interest may be accessed at a future time. Subsequently, analytic queries may be established according to the disclosed schemes to obtain the desired data (RSSI and associated position information) from the database to be graphically depicted, for example, on a map overlay including a position of the specific location about which the fidelity of the network is being evaluated.

In the current implementation of VDLM2, as indicated above, XID commands contain GPS information, while each ground station that receives the frame records the signal level for reception of the frame by that particular ground station. Given the location of the aircraft at the time that the XID was sent, implementations of the disclosed schemes may indicate aircraft locations associated with particularly-measured data transmissions on a map with an icon. Using for example the RSSI level as an indicator, the disclosed schemes may provide a plot in which colors of icons may be assigned, or otherwise manipulated, to produce an easy-to-interpret color encoded map to display the coverage area of the ground station. The coverage can be further analyzed to display coverage at desired altitude ranges.

As noted above, coverage simulations that predict coverage around particular ground stations are used as a method to establish an initial lay down for those ground stations. Deployment implementation may be provided based on those simulations. The disclosed schemes may provide a capacity by which to verify and improve those simulations, allowing for better ground station location and more predictable coverage from each station, which can be subsequently verified in order to enhance the fidelity of the network of ground stations as required when actual RF coverage of the network measurably differs from that predicted by the simulation. In this regard, the coverage maps produced according to the inventive concepts disclosed herein may prove useful in identifying RF issues with certain ground station installations. For example, an effect on particular ground stations where buildings or terrain may cause unforeseen coverage issues may be uncovered. These deviations from the simulations may become clear as a color code for differentiation of signal levels of the downlink from the aircraft is plotted. Effects of mountains and other terrain characteristics may also become apparent from the coverage maps produced according to the inventive concepts disclosed herein.

Referring now to FIG. 1, an exemplary coverage map presentation 100 that may be produced according to the inventive concepts disclosed herein is shown, in which fairly symmetrical and unobstructed coverage is measured around a particular location. In the depiction in FIG. 1, the particular location about which the coverage map is developed is an airport facility 110. As shown in the legend, individual "colors" (which an actual implementations may be according to any color-coding scheme that a particular user may desire) are selected and depicted for particular ranges of RSSI in units of, for example, dBm or decibel-milliwatts. The depicted ranges are representative only of ranges that may be used for differentiable depiction on a produced RF coverage map such as that shown in FIG. 1. These ranges are illustrative only, and should not be considered to be limiting to the subject matter of this disclosure in any way. Any set of range parameters that a particular user may choose to implement may be comparatively represented.

Figure 2:
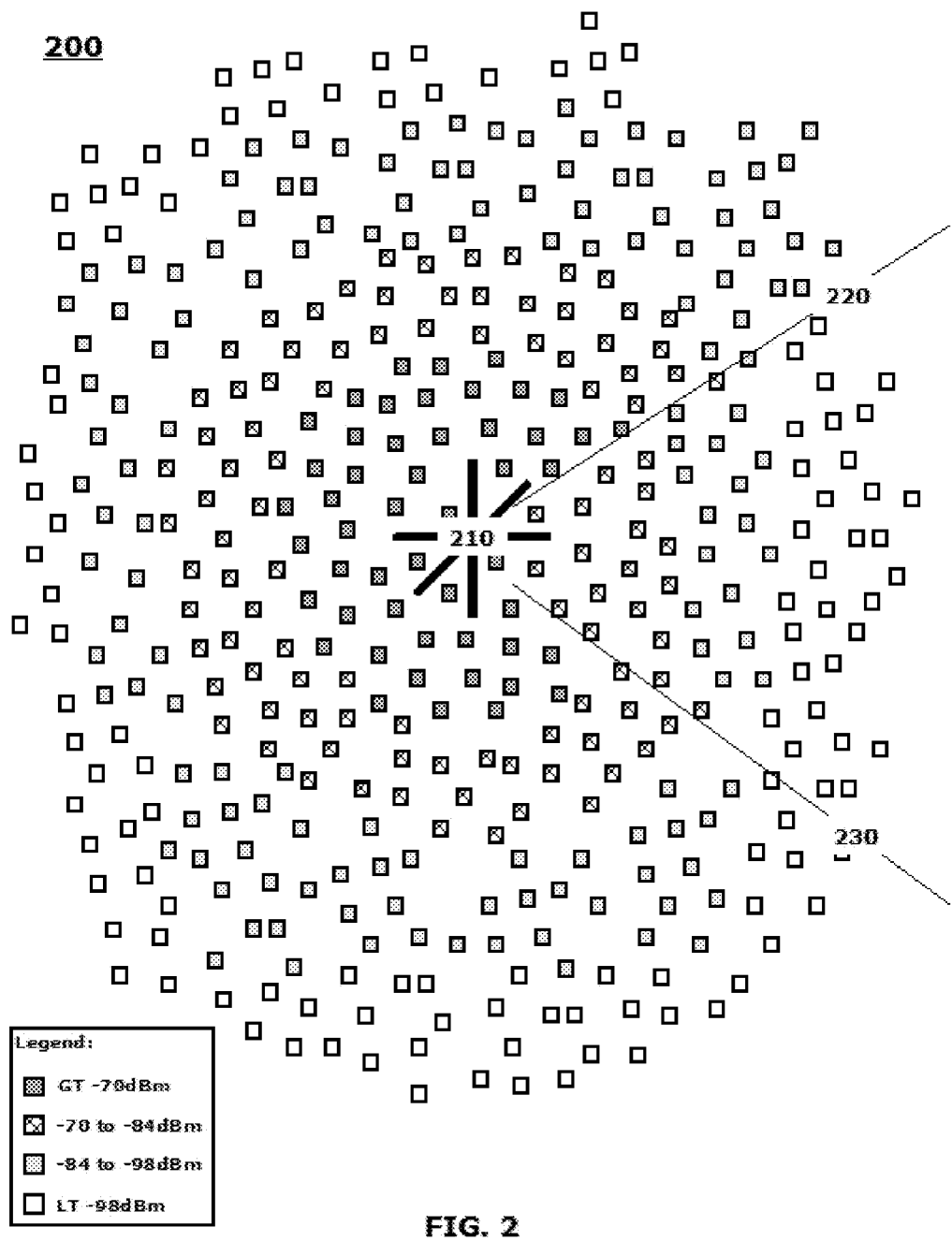
FIG. 2 illustrates a second exemplary coverage map presentation that may be produced according to the inventive concepts disclosed herein in which an effect of an obstruction in a certain sector may be discerned.

Referring now to FIG. 2, an exemplary coverage map presentation 200 that may be produced according to the inventive concepts disclosed herein is shown, in which an effect of an obstruction in a certain sector may be discerned. As shown in FIG. 2, the produced RF coverage map presentation 200 about an airport facility 210 reveals a certain asymmetry as it pertains to a sector roughly defined according to the vectors 220, 230. An evaluation of reduced RF propagation in this area may reveal an obstruction, such as, for example, a building, that was unforeseen by the simulation from which the initial ground station laid down was developed. Armed with the information provided by such an RF coverage map 200, system/network architects may determine a best positioning for an additional ground station node, or repositioning of an existing ground station node to address the identified gaps, or drop off, in coverage in the affected sector.

Figure 3:
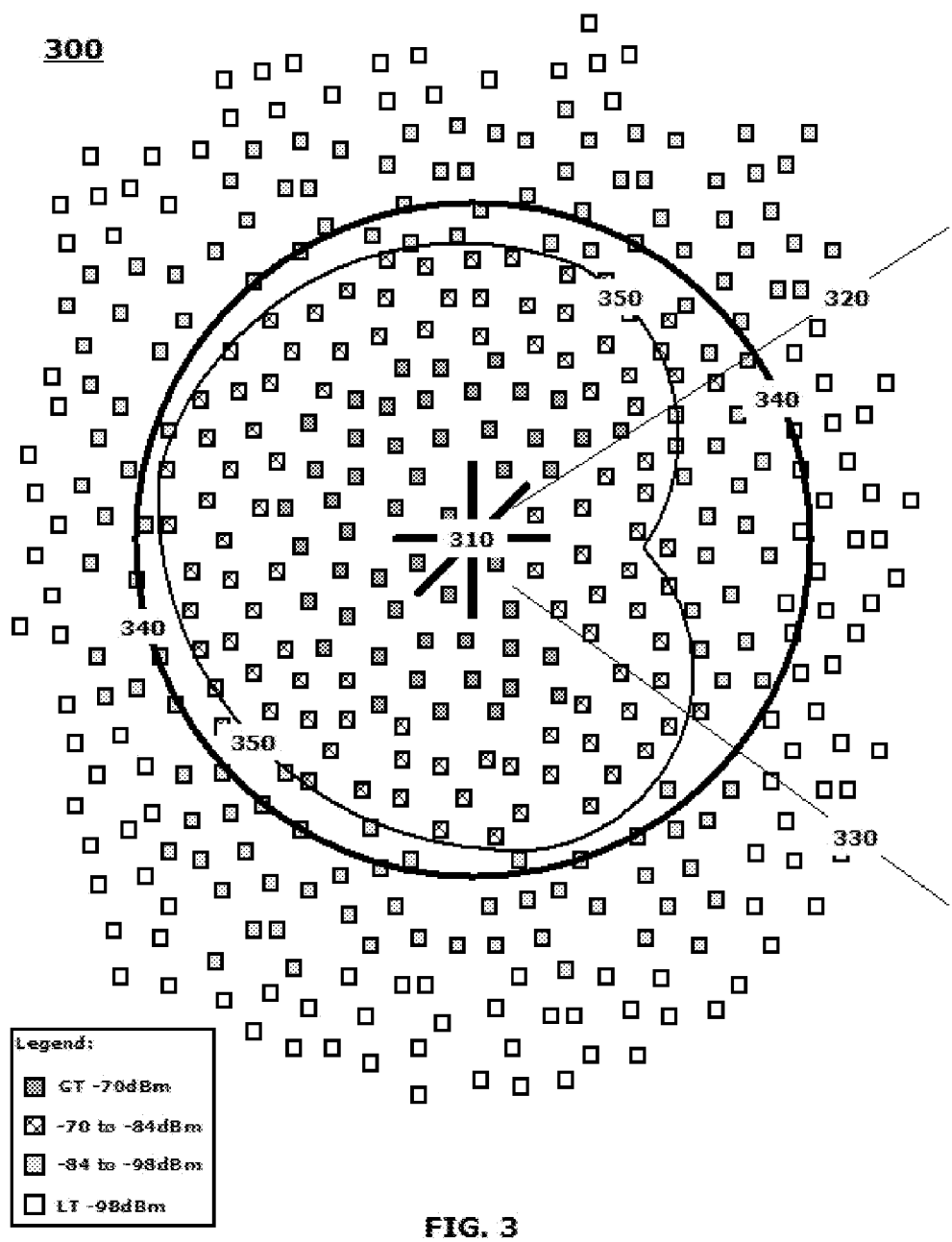
FIG. 3 illustrates a third exemplary coverage map presentation that may be produced according to the inventive concepts disclosed herein in which the second exemplary coverage map presentation according to FIG. 2 may be supplemented with an overlay of anticipated coverage map produced by a simulation for comparison.

Referring now to FIG. 3, an exemplary coverage map presentation 300 that may be produced according to the inventive concepts disclosed herein is shown, in which the second exemplary coverage map presentation according to FIG. 2 may be supplemented with an overlay of anticipated coverage map produced by a simulation for comparison. As was discussed above with reference to FIG. 2, the produced RF coverage map presentation 300 about an airport facility 310 may reveal a certain asymmetry as it pertains to a sector roughly defined according to the vectors 320, 330. A pre-deployment simulation depicted as the circle 340 in the presentation 300 shown in FIG. 3 may not have evaluated, interpreted or otherwise forecast such an asymmetry based on a locally-present obstruction. Actual measured data may be plotted according to the produced RF coverage map and the simulation may be updated to produce a modified simulation overlay 350 depicting the actual conditions. In this manner, an iterative process may be undertaken to enhance the fidelity of the simulation. As noted above with reference to the individual data points depicted on the coverage map presentation 300, individual areas covered by the pre-deployment simulation circle 340 and/or the modified simulation overlay 350 may be additionally color-coded for ease of interpretation.

Figure 4:
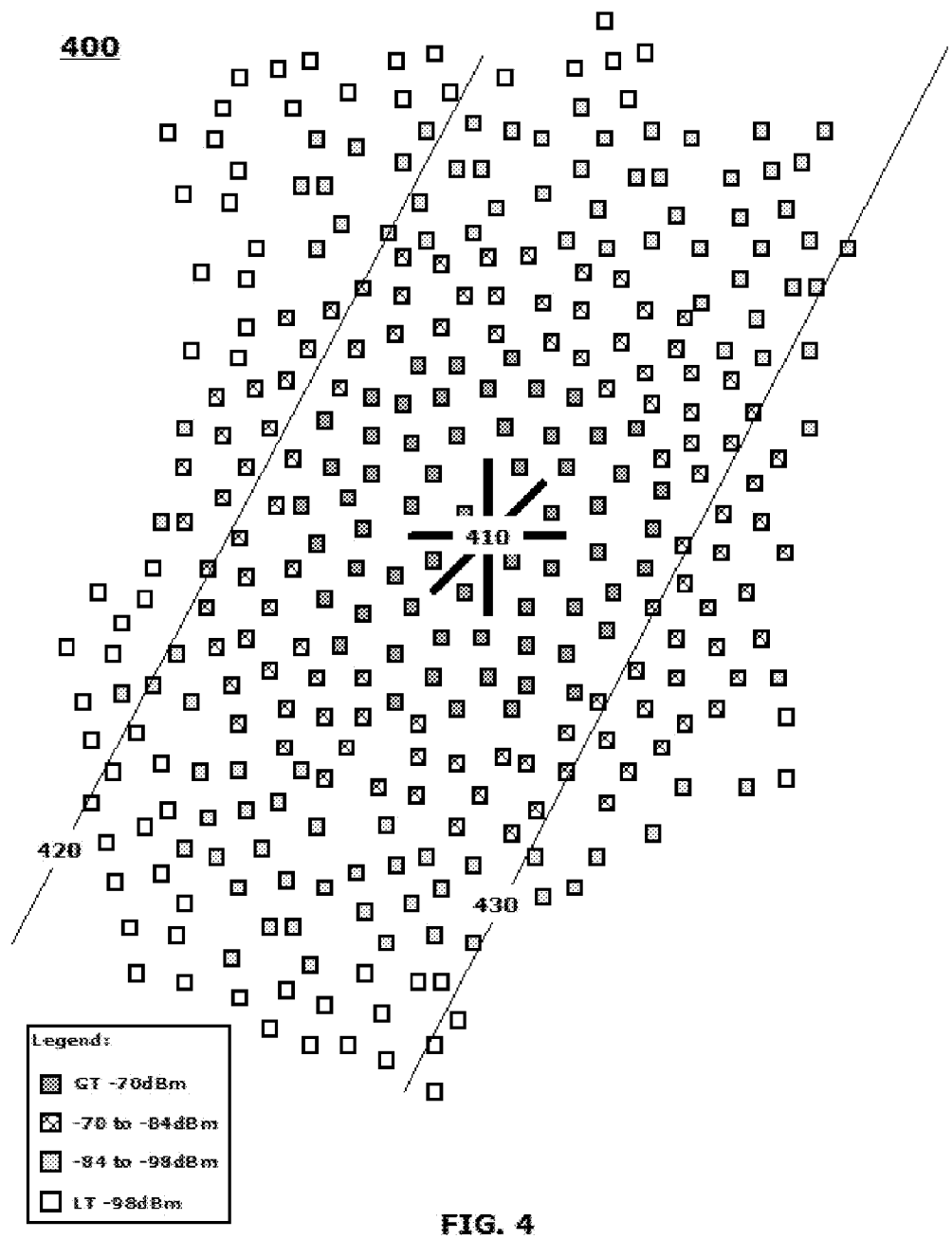
FIG. 4 illustrates a fourth exemplary coverage map presentation that may be produced according to the inventive concepts disclosed herein in which a tunneling effect based on the observed location being in a valley between two mountain ranges may be discerned.

Referring now to FIG. 4, an exemplary coverage map presentation 300 that may be produced according to the inventive concepts disclosed herein is shown, in which a tunneling effect based on the observed location being in a valley between two mountain ranges may be discerned. As shown in FIG. 4, the produced RF coverage map presentation 400 about an airport facility 410 reveals a different asymmetry from that depicted in FIG. 2 that, in this case, may be based on the fact that the airport facility 410 is located in a valley between two mountain ranges roughly following the two depicted vectors 420,430. Here again, an evaluation of reduced RF propagation beyond the putative mountain ranges may provide, in a first instance, a capacity by which aircrews may be routinely alerted as to potential degradations or losses in data communication coverage in these areas, or moreover may provide system/network architects again a roadmap for best positioning for additional ground station nodes, to address the identified gaps, or drop off, in coverage in the affected areas. Different from the difficulty identified by the depiction in FIG. 2, i.e., a local building obstruction, likely in close proximity to one or more of the ground stations, the difficulty identified by the depiction in FIG. 4 may be recognized as being far more altitude dependent.

Figure 5:
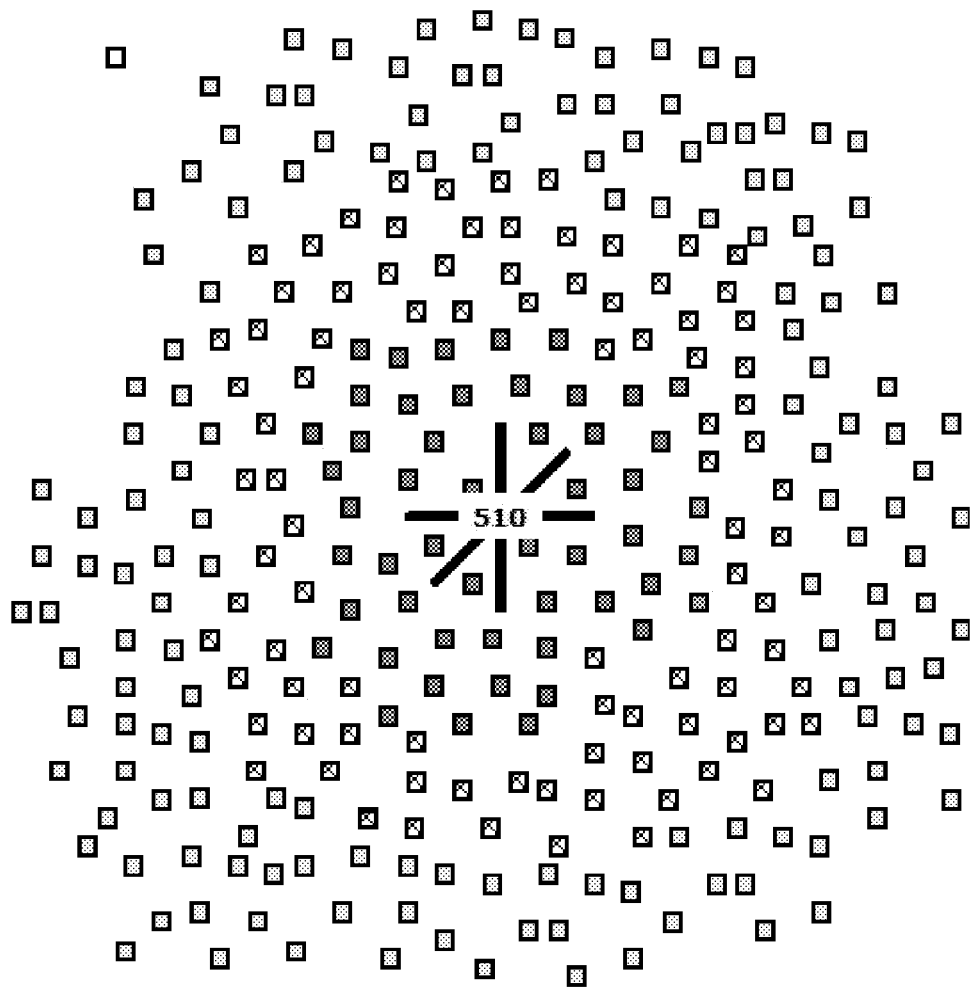
FIG. 5 illustrates a fifth exemplary coverage map presentation that may be produced according to the inventive concepts disclosed herein in which an effect of a higher ambient RF noise level in a particular area may be discerned.
Figure 5:

Referring now to FIG. 5, an exemplary coverage map presentation 500 that may be produced according to the inventive concepts disclosed herein is shown, in which an effect of a higher ambient RF noise level in a particular area may be discerned. As shown in FIG. 5, the produced RF coverage map presentation 500 about an airport facility 510 under detailed interpretation may be considered to reveal an overall reduction in ranges, and far fewer communications at the edges of the depiction of the produced RF coverage map based on what may be evaluated as a presence of a higher than normal ambient RF noise level in a vicinity of the airport facility 510. As with others of the anomalies identified above, the presence of such a higher than normal ambient RF noise level may not be ascertainable in any manner by which to modify a particular simulation in a manner that may account for the anomalous situations. An evaluation of reduced RF propagation based on the measured effects as depicted in the RF coverage map 500 may provide system/network architects and/or administrators with a particular planning tool by which to address the adverse effects presented by the anomalous conditions in a vicinity of the airport facility 510.

Figure 6:
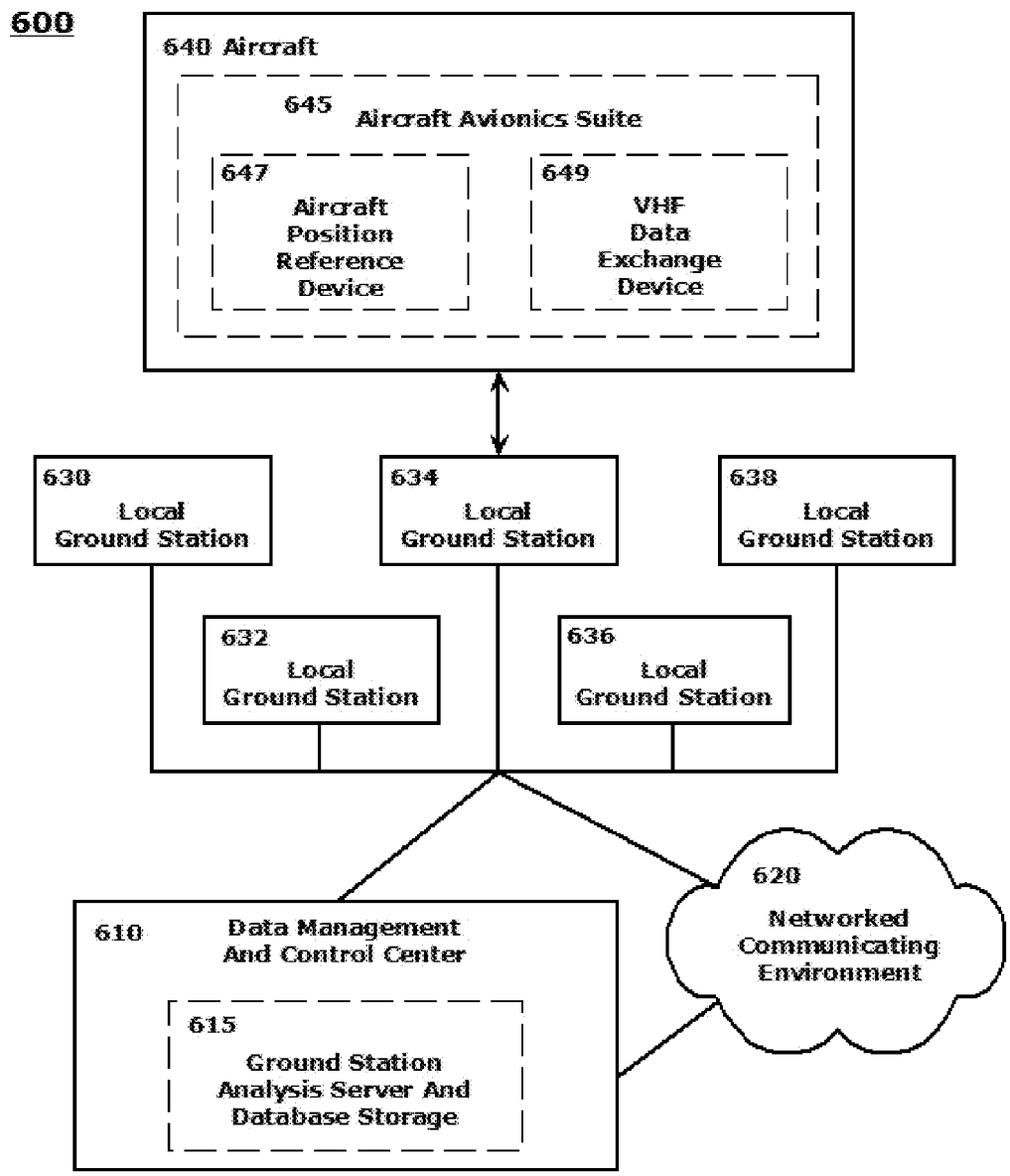
FIG. 6 illustrates an exemplary embodiment of an operating environment including a communication and control network in which a scheme for producing an RF network coverage map according to the inventive concepts disclosed herein may be implemented.

Referring now to FIG. 6, an exemplary embodiment of an operating environment including a communication and control network in which a scheme for producing an RF network coverage map according to the inventive concepts disclosed herein is shown. As shown in FIG. 6, the exemplary operating environment 600 may include a plurality of local ground stations 630-638 by which communications may be established with an aircraft 640 operating in a vicinity of the local ground stations 630-638.

Each aircraft 640 may have an onboard aircraft avionics suite 645 that may incorporate a plurality of communications components including at least an aircraft position reference device 647 and a VHF data exchange device 649. The aircraft position reference device may, for example, be according to a Global Positioning Satellite (GPS) system reception and reporting capability on board the aircraft. The VHF data exchange device 649 may facilitate VHF data communications with the local ground stations 630-638 according to a VDLM2 network communication standard. As the aircraft 640 transits an area supported by the local ground stations 630-638, communications may be automatically established between the aircraft avionics suite 645 and one or more of the local ground stations 630-638 for data exchange as described above.

As depicted, the local ground stations 630-638 may, in turn, be monitored and/or controlled, or may otherwise be in communication with, a data management and control center 610, with which the local ground stations 630-638 may communicate directly and/or via one or more network communicating environments 620.

The data management and control center 610 may house a ground station analysis server and database storage component 615, as will be described in greater detail below, in which samples of aircraft locations and associated RSSI information may be collected and stored for analysis, and particularly for supporting a scheme for RF coverage map generation according to the inventive concepts disclosed herein. Details of certain exemplary components, units and/or functions of the ground station analysis server and data storage 615 will be described in detail below with reference to FIG. 7.

Figure 7:
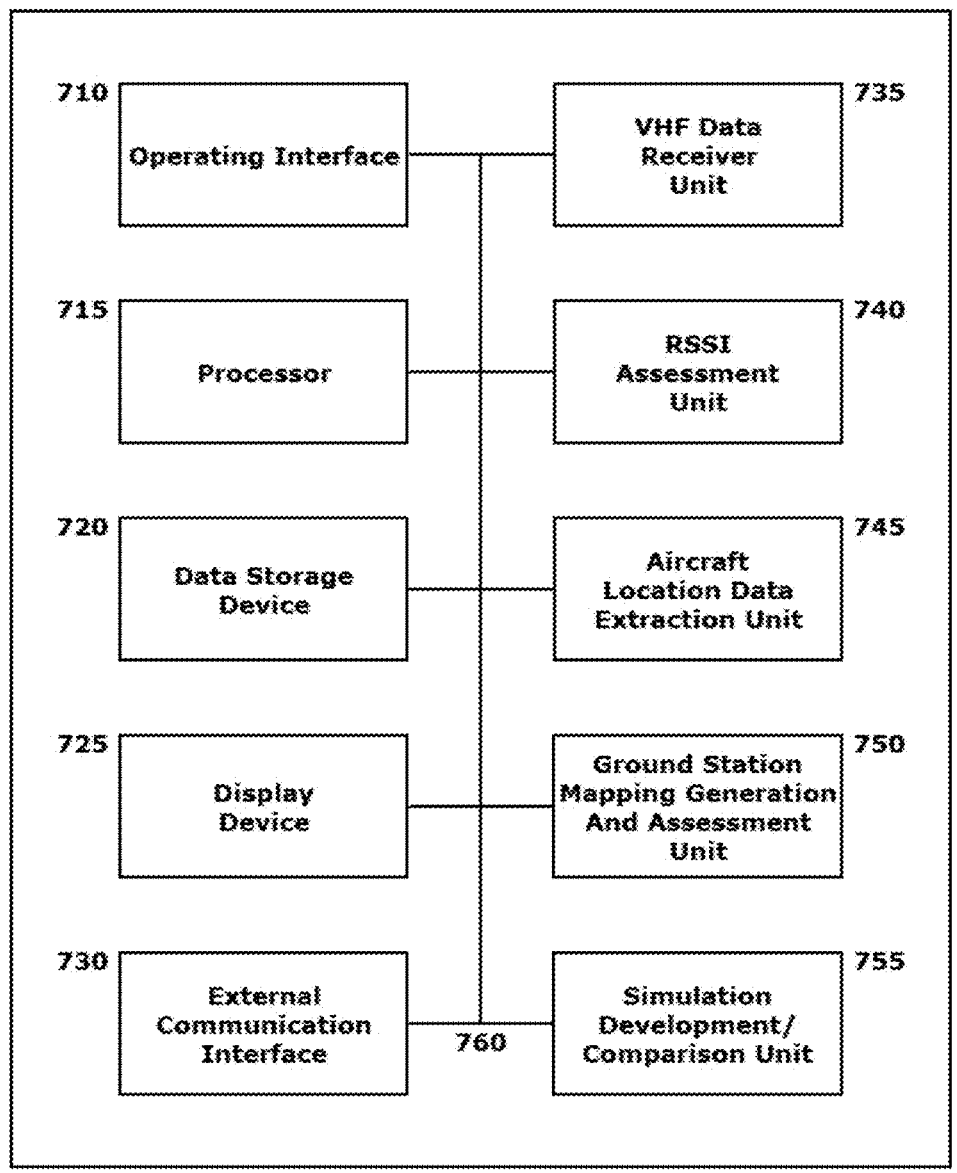
FIG. 7 illustrates an exemplary embodiment of a ground-based server system for collecting and analyzing the data by which to produce an RF network coverage according to the inventive concepts disclosed herein.

Referring now to FIG. 7, an exemplary embodiment of a ground-based server system 700 for collecting and analyzing the data by which to produce an RF network coverage according to the inventive concepts disclosed herein is shown.

The exemplary server system 700 may include one or more operating interface(s) 710 by which system commands may be introduced into the exemplary server system 700 by one or more users. Such operating interface(s) 710 may be a part, or a function, of a graphical user interface (GUI) mounted on, integral to, or associated with, the exemplary server system 700. Otherwise, the operating interface 710 may take the form of any commonly-known user-interactive device by which a user input and/or commands are input to an automated processing system for communication and user interaction with exemplary server system components (physical or virtual). These commonly-known user-interactive devices may include, but not limited to, keyboards or touchscreens (including those associated with wireless communicating devices), a mouse or other pointing device, a microphone for providing verbal commands, or any other commonly-known operating interface devices.

The exemplary server system 700 may include one or more local processors 715 for carrying out the individual operations and functions of the exemplary server system 700. The processor(s) 715 may reference available aircraft geolocating information and associated RSSI information stored in the database to form a basis for generating an analytic coverage map presentation of actual RF data communication propagation with respect to a plurality of local ground stations associated with a particular location. Based on inputs received via the operating interface 710, the local processors 715 may define particular parameters including, for example, displayable ranges of RF propagation values, and color codes associated with each of the differently-displayable ranges to produce an RF coverage map presentation according to a particular user's desires in the manner described generally above.

The exemplary server system 700 may include one or more data storage devices 720. Such data storage device(s) 720 may be used to store data or operating programs to be used by the exemplary server system 700, and specifically the processor(s) 715 in carrying into effect the disclosed operations and functions for data collection in support of, and RF coverage map generation. Data storage device(s) 720 may be used to store databases of collected associated information regarding a large number of aircraft flights in a vicinity of a particular location supported by a network of local ground stations, and particularly to store, in a database format, information regarding aircraft locations and associated RSSI information to be queried and/or extracted for use in the generation of the RF coverage maps as desired by a particular user.

The data storage device(s) 720 may include cloud-based data storage components, or otherwise may be in a form of a random access memory (RAM) or another type of dynamic storage device (actual or virtual) that is capable of storing updatable database information, and for separately storing instructions for execution of system operations by, for example, processor(s) 715. Data storage device(s) 720 may also include a read-only memory (ROM), which may include a conventional ROM device, a virtual ROM or another type of static storage device that stores static information and instructions for processor(s) 715. It is anticipated that the data storage device(s) 720 according to the disclosed schemes may generally be provided external to, and in wireless communication with, other system components. Such configuration does not, however, preclude the physical location of one or more data storage device(s) 720 in, for example, a data management and control center such as that shown in FIG. 6. Nor does such a proposed configuration preclude wired communications between system components and one or more of the data storage device(s) 720.

The exemplary server system 700 may include at least one display device 725, which may be configured as one or more conventional mechanisms that output information to a user, including, but not limited to, a digital data display screen associated with the exemplary system server 700. Such a local display device 725 may be provided for a user, for example, to review a visual representation of the generated RF coverage map (in accordance with any of the depiction shown in, for example, FIGS. 1-5), as well as parameters for the generation of the RF coverage map.

The exemplary system server 700 may include one or more external communication interfaces 730 by which the exemplary system server 700 may communicate with, for example, the plurality of local ground stations at a particular location. The one or more external communication interfaces 730 may be particularly configured to support any manner of wireless communication, including radio, cellular, SATCOM and other available communication links between the plurality of local ground stations and the exemplary system 700. These external data communication interfaces 730 are not limited in the communications protocols that they facilitate.

The exemplary server system 700 may include one or more of a series of particularized data collection and analysis units. Each of the below described data analysis and collection units may be, for example, a physical implementation, a virtual implementation, or a functional implementation, of a particular task undertaken by the exemplary server system 700 to carry into effect the disclosed schemes. In this regard, each of these particularly-identified data analysis and collection units may comprise a cloud-based server component or a physical server component as one or more of a stand-alone device, or as a function of a more generalized server system component, including one or more of the processor(s) 715.

The exemplary server system 700 may include a VHF data receiver unit 735 that may be particularly usable to communicate via one or more external communication interfaces 730 with the plurality of local ground stations for receiving VHF data therefrom. As indicated above, data formatting according to the VDLM2 protocol provides XID frames in a particular format. The data may be received by the VHF data receiver unit 735 and may then be acted upon by other physical or functional components within the exemplary server system 700.

The exemplary server system 700 may include an RSSI assessment unit 740, which may be usable to extract RSSI data from the VHF data received via the VHF data receiver unit 735 and to assign the extracted RSSI data to a particular range as may be specified by user, for example, via the operating interface 710, and/or according to a stored scheme for RF coverage map generation.

The exemplary server system 700 may include an aircraft location data extraction unit 745, which may be usable to separately extract aircraft location data associated with the extracted RSSI data VHF data received be the VHF data receiver unit 735. As indicated specifically above, it is the combination of the aircraft location data in proximity to one or more of the local ground stations combined with the RSSI data extracted for that particular location from the VHF status communications between the ground stations and the aircraft that form the basis for presenting particularly color-coded points on a map overlay in formation of the RF coverage map associated with the particular location under observation.

The exemplary server system 700 may include a ground station mapping generation and assessment unit 750 by which, according to a user inquiry input via an operational interface 710, or otherwise according to a stored scheme, a stored database of extracted RSSI information and associated aircraft location data information may be collected and analyzed for display as particularly color-coded points on a map overlay in an RF coverage map generating mode. Separately, an automated assessment may be undertaken with regard to the generated RF coverage map in order to determine areas in which gaps in coverage may be indicated. In embodiments, according to some user preferred scheme, one or more solutions to address the particular gaps in coverage may be proposed. Otherwise, a generated RF coverage map may be presented on, for example, a display device 725 or output in hardcopy in order that system architects and/or network planners may undertake a manual analysis of the generated RF coverage map to determine a range of options for addressing the particular gaps in coverage highlighted by the presentation on the generated RF coverage map.

The exemplary server system 700 may include a simulation development/comparison unit 755 by which an initial simulation that was used to provide a pre-deployment laydown for the plurality of local ground stations at a particular location may be iteratively updated based on the actual information collected for the generation of the RF coverage map. The simulation development/comparison unit 755 may generate a color-coded overlay to be presented on the generated RF coverage map substantially in the manner shown, for example, in FIG. 5 in order to provide a best approximation regarding actual conditions versus pre-planned conditions for a particular layout of local ground stations at a particular location.

All of the various components of the exemplary server system 700, as depicted in FIG. 7, as is mentioned above, may be physical components, virtual components or combinations thereof connected internally within the exemplary server system 700, or separately and remotely, with each other, via combinations of wired and wireless communication pathways 760 to facilitate data exchange internally, with the various nodes with which the exemplary server system 700 may communicate, and with the local ground stations in communication with the aircraft avionics suites to support the RF coverage map generation schemes provided by the exemplary server system 700.

It should be appreciated that, although depicted in FIG. 7 as a series of separate discrete units with specific operating functionalities, the various disclosed elements of the exemplary server system 700 may be arranged in any combination of sub-systems as individual components or combinations of components, actual or virtual. In other words, no specific configuration of the exemplary server system 700 as an integral unit, or as a combination of supported components, is to be implied by the depiction in FIG. 7. Further, although depicted as individual units for ease of understanding of the details provided in this disclosure regarding the exemplary server system components, it should be understood that the described functions of any of the individually-depicted components may be undertaken, for example, by one or more physical or virtual processors within, connected to, and/or in communication with, the separate system components of the exemplary server system 700.

Figure 8:
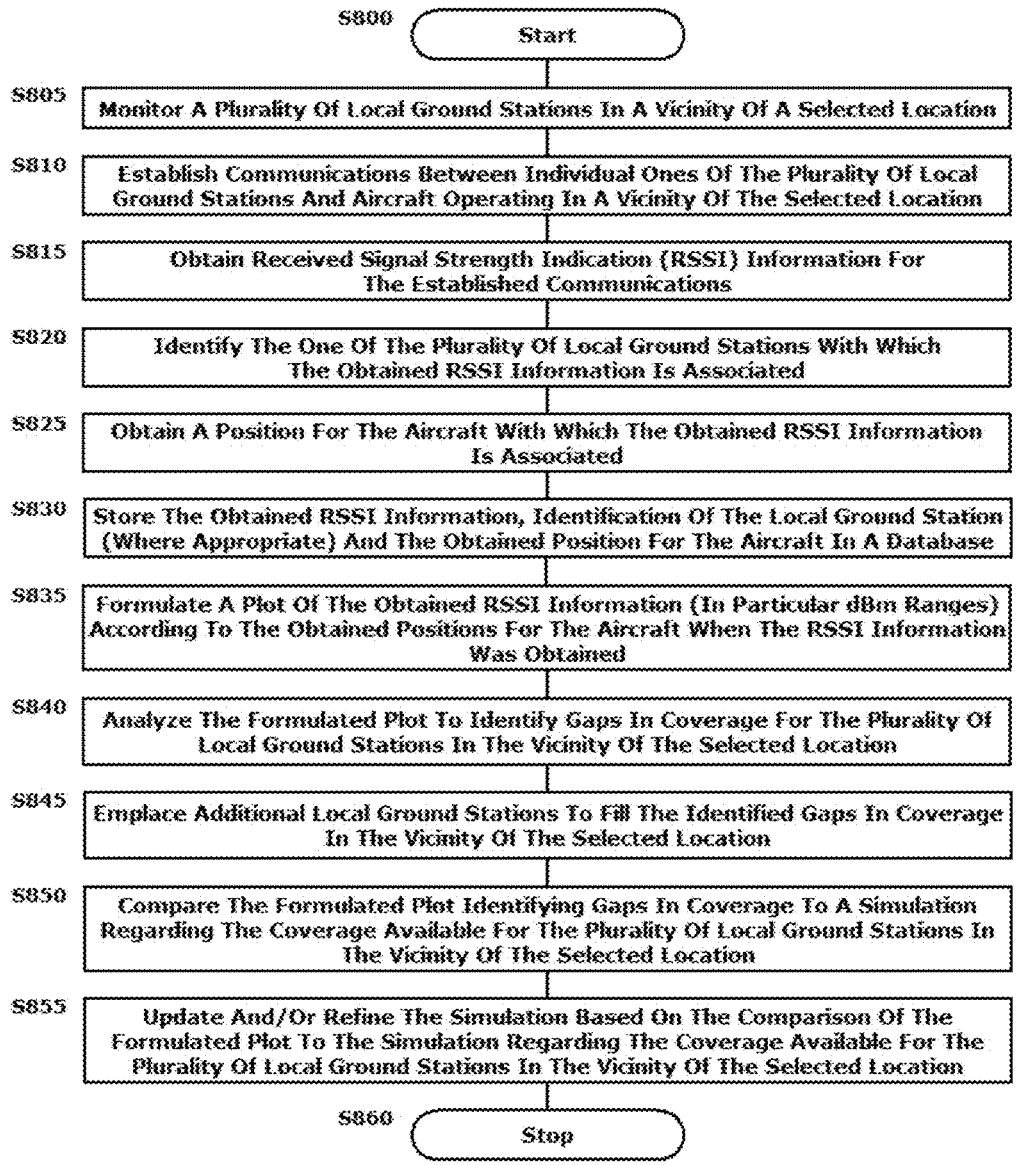
FIG. 8 illustrates a flowchart of an exemplary method for implementing a scheme for producing an RF coverage map according to the inventive concepts disclosed herein.

The disclosed embodiments may include an exemplary method for implementing a scheme for producing an RF coverage map. FIG. 8 illustrates a flowchart of such a method. As shown in FIG. 8, operation of the method commences at Step S800 and proceeds to Step S805.

In Step S805, a plurality of local ground stations in a vicinity of a selected location may be monitored. This monitoring may occur, for example, from a centralized data management and control center. Operation of the method proceeds to Step S810.

In Step S810, communications may be established between individual ones of the plurality of local ground stations of aircraft operating in a vicinity of the selected location. Operation of the method proceeds to Step S815.

In Step S815, RSSI information may be obtained for the established communications. Operation of the method proceeds to Step S820.

In Step S820, the one of the plurality of local ground stations with which the obtained RSSI information is associated may be identified. The identification of such local ground stations may provide additional information for storage in the database in order to, for example, interpret the other accumulated information in a context of performance of the individually-identified one of the local ground stations. Operation of the method proceeds to Step S825.

In Step S825, a position for the aircraft with which the obtained RSSI information is associated may be obtained. This information may be obtained from the same data communication or from another contemporaneous data communication between the one of the plurality of local ground stations and the aircraft. Operation of the method proceeds to Step S830.

In Step S830, the obtained RSSI information, identification of the one of the plurality of local ground stations (where appropriate) and the obtained position for the aircraft may be stored in a database. Operation of the method proceeds to Step S835.

In Step S835, a plot of the obtained RSSI information (which may be depicted in particular dBm ranges, for example) according to the obtained positions for the aircraft when the RSSI information was obtained may be formulated. As indicated above, this formulation may result in the generation of an RF coverage map for display on a display device, or for output as a hardcopy in order to provide a particular user a basis by which to assess RF coverage, gaps in that coverage, and opportunities for revising and laydown of the plurality of local ground stations to mitigate or eliminate such gaps, as in the steps of the method below. Operation of the method proceeds to Step S840.

In Step S840, an analysis of the formulated plot to identify gaps in coverage for the plurality of local ground stations in the vicinity of the selected location may be undertaken in an automated, or manual, manner as described generally above. Operation of the method proceeds to Step S845.

In Step S845, a decision may be made to emplace additional local ground stations to fill the identified gaps in the coverage in the vicinity of the selected location. It should be noted that the inventive concepts as disclosed herein provide a planning and analysis tool rather than any particular solution based on the analysis presented by the generated RF coverage map. Emplacing additional local ground stations is but one of the proposed solutions for mitigating the effects of identified gaps or other shortfalls that may arise as a result of an analysis of the generated RF coverage map. Operation of the method proceeds to Step S850.

In Step S850, the formulated plot identifying gaps in coverage may be compared to a simulation regarding expected RF coverage available for the plurality of local ground stations in the vicinity of the location. This comparison may allow user to assess the overall utility, validity, or the like of the particular simulation that was used. Operation of the method proceeds to Step S855.

In Step S855, the simulation may be updated or refined based on the comparison of the formulated plot to the simulation regarding the coverage available for the plurality of local ground stations in the vicinity of the selected location. This step may be undertaken as an iterative process in order to provide better fidelity for future use of the particular simulation employed. Operation of the method proceeds to Step S755, where operation of the method ceases.

The disclosed embodiments may include a non-transitory computer-readable medium storing instructions which, when executed by a processor, may cause the processor to execute all, or at least some, of the steps of the method outlined above.

The inventive concepts disclosed herein are directed at providing a planning tool based on actual data with regard to RF propagation for network assets, particularly network assets communicating with aircraft operating in a vicinity of a particular location, including, for example, an airport. As indicated above, the generated RF coverage maps may have significant utility in verifying RF coverage, or otherwise in identifying gaps in the RF coverage to which solutions may be applied to mitigate or eliminate the particularly-identified gaps.

The above-described exemplary systems and methods reference certain conventional components to provide a brief, general description of suitable operating environments in which the subject matter of this disclosure may be implemented for familiarity and ease of understanding. Although not required, embodiments of the disclosed systems, and implementations of the disclosed methods, may be provided, at least in part, in a form of cloud-based applications, hardware circuits, firmware, or software computer-executable instructions to carry out the specific functions described. The cloud-based applications, hardware circuits, firmware, or software-executable instructions may include individual program modules executed by the one or more processors. Generally, program modules include routine programs, objects, components, data structures, and the like that perform particular tasks or implement particular data types in support of the overall objective of the systems and methods according to this disclosure.

Those skilled in the art will appreciate that other embodiments of the disclosed subject matter may be practiced in generating RF coverage maps based on available aircraft geolocating information and associated RSSI information for data transmissions occurring at the specified locations according to many network configurations, local ground station deployment schemes, communication data exchange protocols, and the like.

As indicated above, embodiments within the scope of this disclosure may also include computer-readable media having stored computer-executable instructions or data structures that may be accessed, read and executed by one or more processors in differing devices, as described. Such computer-readable media can be any available media that can be accessed by a processor, general purpose or special purpose computer. By way of example, and not limitation, such computer-readable media may comprise RAM, ROM, EEPROM, CD-ROM, flash drives, data memory cards, virtual data components and structures, or other analog or digital data storage devices that may be used to carry or store desired program elements or steps in the form of accessible computer-executable instructions or data structures. When information is transferred or provided over a network or another communication connection, whether wired, wireless, or in some combination of the two, the receiving processor may properly view the connection as a computer-readable medium. Thus, any such connection is properly termed a computer-readable medium. Combinations of the above should also be included within the scope of the computer-readable media for the purposes of this disclosure.

Computer-executable instructions may include, for example, non-transitory instructions and data that can be executed and accessed respectively to cause a processor to perform certain of the above-specified functions, individually or in various combinations. Computer-executable instructions may also include program modules that are remotely stored for access and execution by a processor.

The exemplary depicted sequence of executable instructions, or associated data structures, represents one example of a corresponding sequence of acts for implementing the functions described in the steps of the above-outlined exemplary method. The exemplary depicted steps may be executed in any reasonable order to carry into effect the objectives of the disclosed embodiments. No particular order to the disclosed steps of the method is necessarily implied by the depiction in FIG. 8, except where execution of a particular method step is a necessary precondition to execution of any other method step. In this regard, certain of the described steps in the method may be executed in parallel, and in near simultaneous timing. Also, certain of the described steps in the method may be appropriately omitted.

Although the above description may contain specific details, they should not be construed as limiting the claims in any way. Other configurations of the described embodiments of the disclosed systems and methods are part of the scope of this disclosure. It will be appreciated that several of the above-disclosed and other features and functions, or alternatives thereof, may be desirably combined into many other different systems or applications. Although the above description may contain specific details, they should not be construed as limiting the claims in any way. Other configurations are part of the scope of the disclosed embodiments. For example, the principles of the disclosed embodiments may be applied separately to each individual user aircraft in the manner described. Each user may individually employ components of the disclosed systems and methods to their advantage without any reference to information being pushed to other users. This enables each user to enjoy the benefits of the disclosed embodiments even if any one of the large number of possible applications do not need some portion of the described functionality. In other words, there may be multiple instances of the disclosed systems each processing the content in various possible ways. It does not necessarily need to be one system used by all end users. Accordingly, the appended claims, and their legal equivalents, should only define the disclosed embodiments, rather than any specific example given.

We claim:

1. A network analysis system, comprising:
a data exchange device communicatively coupled with participating aircraft operating in a vicinity of the data exchange device, the data exchange device comprising a network of communicatively-connected ground stations, the network of communicatively-connected ground stations being configured to monitor the participating aircraft operating in a specified region; and
a processor that is programmed to:
receive operating data from the participating aircraft;
extract a position of at least one of the participating aircraft from the received operating data;
assess a signal strength of communications with the at least one of the participating aircraft for the extracted position;
generate a data element including the assessed signal strength for the extracted position of the at least one of the participating aircraft;
analyze a plurality of the data elements to assess anomalies in communication coverage provided by the network of communicatively-connected ground stations in the specified region;
generate a comparison of the assessed anomalies with a simulation of anticipated coverage for the network of communicatively-connected ground stations; and
output a graphical indication of the generated data element.

2. The system of claim 1, the processor being further programmed to generate an output coverage map by plotting a plurality of the graphical indications of generated data elements for a plurality of communications with the participating aircraft.

3. The system of claim 1, the processor being further programmed to generate an output coverage map by plotting a plurality of the graphical indications of the generated data elements for a plurality of communications with a plurality of the monitored participating aircraft operating in the specific region.

4. The system of claim 1, the assessed anomalies including an identification of an interfering background radio-frequency (RF) noise level in at least a discrete portion of the specified region.

5. The system of claim 1, the processor being programmed to modify the simulation based on the comparison.

6. The system of claim 1, communications between the data exchange device and the participating aircraft comprising Very High Frequency (VHF) data communications.

7. The system of claim 1, the VHF data communications being according to a VHF Data Link Mode 2 (VDLM2) Network communicating protocol.

8. The system of claim 1, further comprising a storage device for storing a plurality of the generated data elements.

9. A method for implementing a network analysis, comprising:
- establishing communications between a data exchange device and participating aircraft operating in a vicinity of a the data exchange device, the data exchange device comprising a network of communicatively-connected ground stations, the network communicatively-connected ground stations being configured to monitor participating aircraft operating in a specified region;
- receiving, with a processor, operating data from the participating aircraft;
- extracting, with the processor, position reference data for at least one of the participating aircraft from the received operating data;
- assessing, with the processor, a signal strength of communications with the at least one of the participating aircraft, the assessed signal strength being correlated to the extracted position reference data;
- generating a data element including an assessed signal strength indication for the correlated extracted position reference data for the at least one of the participating aircraft;
- analyzing the plurality of the data elements to assess anomalies in communication coverage provided by the network of communicatively-connected ground stations in the specified region;
- generating a comparison of the assessed anomalies with a simulation of anticipated coverage for the network of communicatively-connected ground stations; and
- outputting a graphical indication of the generated data element.

10. The method of claim 9, further comprising generating an output coverage map by plotting a plurality of the graphical indications of generated data elements for a plurality of communications with the participating aircraft.

11. The method of claim 10, wherein
the generating the output coverage map further comprising plotting the plurality of the graphical indications of the generated data elements for the plurality of communications with the plurality of the monitored participating aircraft operating in the specific region.

12. The method of claim 9, the assessed anomalies including at least one of a restriction in communication coverage in a discrete portion of the specified region, and an identification of an interfering background RF noise level in at least a discrete portion of the specified region.

13. The method of claim 9, further comprising:
modifying the simulation based on the comparison.

14. The method of claim 9, communications between the data exchange device and the participating aircraft comprising Very High Frequency (VHF) data communications.

15. The method of claim 14, the VHF data communications being according to a VHF Data Link Mode 2 (VDLM2) Network communicating protocol.

* * * * *